United States Patent

Lo Verso et al.

[11] Patent Number: 5,987,622
[45] Date of Patent: Nov. 16, 1999

[54] PARALLEL COMPUTER SYSTEM INCLUDING PARALLEL STORAGE SUBSYSTEM INCLUDING FACILITY FOR CORRECTION OF DATA IN THE EVENT OF FAILURE OF A STORAGE DEVICE IN PARALLEL STORAGE SUBSYSTEM

[75] Inventors: Susan Lo Verso, Southborough; Eric Sharakan, Brookline; Eric L. Rowe, Natick, all of Mass.; Roger Lee, Monrovia, Calif.

[73] Assignee: TM Patents, LP, Boston, Mass.

[21] Appl. No.: 08/166,345

[22] Filed: Dec. 10, 1993

[51] Int. Cl.[6] .................................................. G06F 11/00
[52] U.S. Cl. ............................................................... 714/6
[58] Field of Search ................................. 395/575, 200; 714/6, 11, 766, 800, 805, 763, 764; 711/5; 364/243, 228.3

[56] References Cited

U.S. PATENT DOCUMENTS

| | | | |
|---|---|---|---|
| 4,761,785 | 8/1988 | Clark et al. | 371/51 |
| 4,814,973 | 3/1989 | Hillis | 364/200 |
| 4,884,194 | 11/1989 | Krol et al. | 364/200 |
| 5,130,992 | 7/1992 | Frey, Jr. et al. | 371/40.1 |
| 5,163,131 | 11/1992 | Row et al. | 395/200 |
| 5,202,979 | 4/1993 | Hillis et al. | 395/575 |
| 5,212,773 | 5/1993 | Hillis | 395/200 |
| 5,258,984 | 11/1993 | Menon et al. | 371/10.1 |
| 5,305,326 | 4/1994 | Solomon et al. | 371/11.1 |
| 5,355,453 | 10/1994 | Row et al. | 395/200 |
| 5,361,363 | 11/1994 | Wells et al. | 395/800 |
| 5,485,474 | 1/1996 | Rabin | 371/37.1 |

Primary Examiner—Robert W. Beausoliel, Jr.
Assistant Examiner—Stephen C. Elmore
Attorney, Agent, or Firm—Cesari and McKenna, LLP

[57] ABSTRACT

A parallel computer system comprising a plurality of processing elements and an input/output system interconnected by a communications network. The input/output system includes a plurality of input/output devices connected to the communications network for receiving messages from, and transmitting messages to, the processing elements over the communications network. The processing element during the storage operation generates a series of messages for transmission over the communications network to successive input/output devices. Each message includes a data item from one of a series of storage locations. The processing element generates for each stripe of a selected number of data items a check value for transmission in a message to another of the input/output devices. During a reconstruction operation, the processing element receives the data items and the check values from at least some of the input/output devices and performs a reconstruction operation in connection with each check value and a stripe of data values for which the check value was generated during the storage operation thereby to reconstruct data items stored in at least one other of the input/output devices.

4 Claims, 10 Drawing Sheets

PARALLEL COMPUTER SYSTEM INCLUDING PARALLEL STORAGE SUBSYSTEM INCLUDING FACILITY FOR CORRECTION OF DATA IN THE EVENT OF FAILURE OF A STORAGE DEVICE IN PARALLEL STORAGE SUBSYSTEM

INCORPORATION BY REFERENCE

U.S. Pat. No. 5,361,363, entitled Input/Output System For Massively Parallel Computer System, issued Nov. 1, 1994, in the name of David Wells, et al., assigned to the assignee of the present application, incorporated by reference.

U.S. Pat. No. 5,333,268, entitled Parallel Computer System, issued Jul. 26, 1994 in the name of David C. Douglas, et al., assigned to the assignee of the present application, incorporated by reference.

FIELD OF THE INVENTION

The invention relates generally to the field of digital data processing systems, and more particularly to storage arrangements for such systems.

BACKGROUND OF THE INVENTION

In storage systems for digital computer systems, it has become common to use error detection and correction (EDC) codes to facilitate detection of errors that may develop in the stored data and to correct such errors. Typically, for example, data is stored on a disk or tape storage device along with associated EDC codes and, when the data is retrieved, the EDC code can be retrieved therewith and used to detect and correct errors that may develop while the data has been stored.

More recently, storage systems have been developed in which data is stored on, and retrieved from, multiple storage devices in parallel. U.S. Pat. No. 5,202,979, entitled Storage System Using Multiple Independently Mechanically-Driven Storage Units, issued Apr. 13, 1993, in the name of W. Daniel Hillis, et al., and assigned to the assignee of the present application, describes such a system. In the aforementioned Hillis patent, an adapter stores data in, and retrieves data from, a set of storage devices SD(j). The adapter provides, in parallel in a series of iterations "i", data words DW(i)(j) to the storage devices SD(j) ("j" is an index from "1" to "J", where "J" is the number of storage devices storing data words in the storage system). That is, during each iteration $i_k$, the adapter transmits a set of data words $DW(i_k)(1)$ through $DW(i_k)(J)$ to the storage devices SD(1) through SD(J) for storage. In each iteration "$i_k$," the adapter also generates an EDC code $EDC(i_k)$ using all of the data words $DW(i_k)(1)$ through $DW(i_k)(J)$, and stores the EDC code in one or more separate EDC storage devices, generally identified SD(edc). When retrieving the previously-stored data, the adapter can retrieve all of the data words $DW(i_k)(1)$ through $DW(i_k)(J)$ stored for a particular iteration, along with the EDC code $EDC(i_k)$ associated therewith, and perform an error detection operation to determine if an error had developed while the data was stored. If the adapter determines that an error had developed, it can further use the EDC code $EDC(i_k)$ to identify the error and correct it. The adapter may repeat these operations to store data words for successive iterations, and in the retrieval of the data words that had been stored in each iteration.

The arrangement described in the Hillis, et al., patent provides a number of advantages. First, since data is stored in, and retrieved from, a number of storage devices in parallel, storage and retrieval operations can proceed faster than for operations with one storage device. Thus, relatively slow inexpensive storage devices can be used to effect storage and retrieval of large blocks of data at relatively high speeds; high-speed individual storage devices, which if available would likely be more expensive, would not be required to achieve similar storage and retrieval speeds. In addition, since the EDC codes are generated with respect to data words across storage devices, if a storage device $SD(j_f)$ fails, is the data words $DW(i)j_f)$ in that storage device can be reconstructed using the data words from the other storage devices and the associated EDC codes EDC(i) From the storage device SD(edc), thereby enhancing reliable availability of data from the storage system.

However, the arrangement described in the Hillis, et al., patent makes use of a single point of control, namely the adapter, to generate the EDC codes EDC(i) for each iteration. This is satisfactory if the storage system receives data from, for example, a single source. Recently, parallel computer systems have been developed in which the storage system may receive data from a number of processing nodes independently. One such system is described in the aforementioned Wells, et al., and Douglas, et al., patent applications. That system includes a number of processing nodes and a number of input/output devices, which may include storage devices, interconnected by communications network. The communications network transfers messages, each including data, between processing nodes, on the one hand, and input/output devices, on the other hand, to facilitate storage of data in, or retrieval of data from, their respective storage devices. In such an arrangement, no one single device is connected between all of the processing nodes and all of the input/output devices to generate EDC codes or to correct data in a manner similar to the adapter in the system described in the aforementioned Hillis, et al., patent.

SUMMARY OF THE INVENTION

The invention provides a new and improved parallel storage arrangement for a parallel computer system.

In brief summary, the parallel computer system comprises a plurality of processing elements and an input/output system interconnected by a communications network. The input/output system includes a plurality of input/output devices connected to the communications network for receiving messages from, and transmitting messages to, the processing elements over the communications network. The processing element during the storage operation generates a series of messages for transmission over the communications network to successive input/output devices. Each message includes a data item from one of a series of storage locations. The processing element generates for each stripe of a selected number of data items a check value for transmission in a message to another of the input/output devices. During a reconstruction operation, the processing element receives the data items and the check values from at least some of the input/output devices and performs a reconstruction operation in connection with each check value and a stripe of data values for which the check value was generated during the storage operation thereby to reconstruct data items stored in at least one other of the input/output devices.

BRIEF DESCRIPTION OF THE DRAWING

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
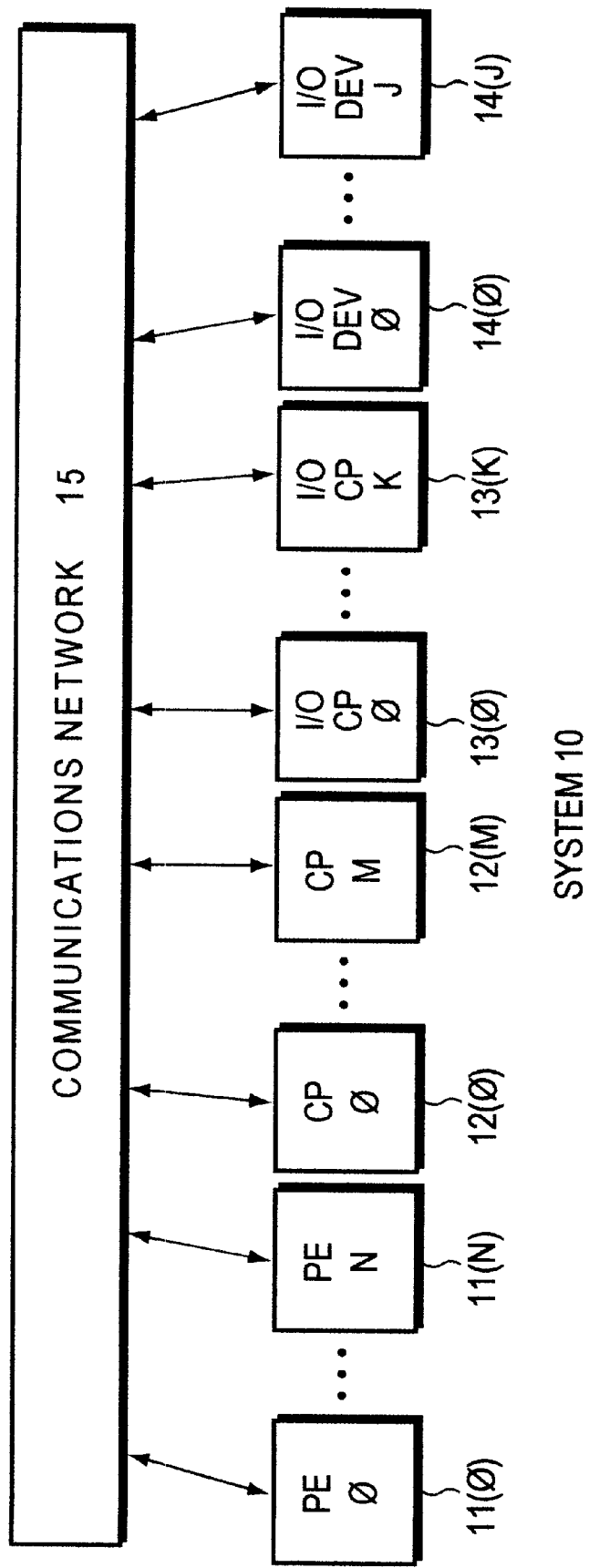
FIG. 1 is a general block diagram of a parallel computer system constructed in accordance with the invention.

FIG. 1 is a general block diagram of a parallel computer system 10 constructed in accordance with the invention. With reference to FIG. 1, system 10 includes a plurality of processing elements 11, control processors 12, input/output control processors 13 and input/output devices 14, all interconnected by a communications network 15. The processing elements 11 receive data from other elements of the system 10, in particular from the input/output devices 14, over the communications network 15 and process it in accordance with commands provided by the control processors 12 over the communications network 15. In processing the data, the processing elements 11 may transfer the data thereamong over the communications network 15. In addition, the processing elements 11 may, while processing the data, generate status information which they transmit to the control processors 12 over the communications network 15, which the control processors 12($m$) can use to control timing and selection of commands which they provide to the processing elements 11. During and after processing, the processing elements 11 may also perform an input/output operation to transfer the processed data to, in particular, the input/output devices 14, which operation may also be under control of input/output commands from the control processors 12.

The control processors 12 also transmit commands to the input/output devices to control their operations during an input/output operation. The input/output devices 14 may include storage devices such as disk or tape storage units and network connections to other computers for supplying information, including data and program instructions, to other elements of the system 10 for processing and to receive processed data therefrom for storage or transmission to other systems (not shown). The input/output devices 14 may also include, for example, video display devices and printers for providing visual and hardcopy data output. In these operations, the input/output devices 14 will transmit and/or receive data over the communications network 15. During input/output operations, the input/output devices 14 may also generate input/output status information and transmit it over the communications network to the control processors 13, which may, in turn, use the input/output status information to control timing and selection of commands which they provide to the input/output devices 14.

One particular embodiment of system 10 may include hundreds or many thousands of processing elements 11 operating on a single problem under control of commands broadcast to them by the control processors 12. In that embodiment, the processing elements 11($n$) operate in parallel on the same command on their individual sets of data. The system 10 is depicted in FIG. 1 as having a single communications network, identified by reference numeral 15. In one particular embodiment, described in the aforementioned Wells, et al., patent application, the system 10 includes two separate networks, namely, a data router and a control network (not shown separately in FIG. 1). In that embodiment, the control network facilitates broadcast by the control processors 12($m$) of commands to the processing elements 11. The processing elements 11 receive the commands and execute them generally concurrently, thereby providing generally parallel processing of the commands. The control network also provides an arrangement for consolidation of the status information generated by the processing elements 11 and for transfer of the consolidated status information to the control processors 12.

In that embodiment, the control network is also partitionable into logical subsystems, each partition including a control processor 12 and a plurality of processing is elements 11, the control processor 12 in the partition supplying the commands to be processed by the processing elements 11 in the partition. The data router is generally used to facilitate data transfer among processing elements 11 and between processing elements 11 and input/output devices 14 during an input/output operation.

Details of a control network and data router used in one embodiment of system 10 are described in the aforementioned Wells, et al., and Douglas, et al., applications, and will not be repeated herein. In brief, both the control network and the data router are generally tree-shaped networks (the data router actually comprising a "fat tree") in which the processing elements 11, control processors 12, input/output control processors 13 and input/output devices 14 are all connected to the leaves. In addition, the Douglas, et al., application describes details of a network interface circuit which may be included in the processing elements 11, control processors 12, input/output control processors 13 and input/output devices 14 to enable them to communicate over the data router and control network, which also will not be repeated herein.

Figure 2:
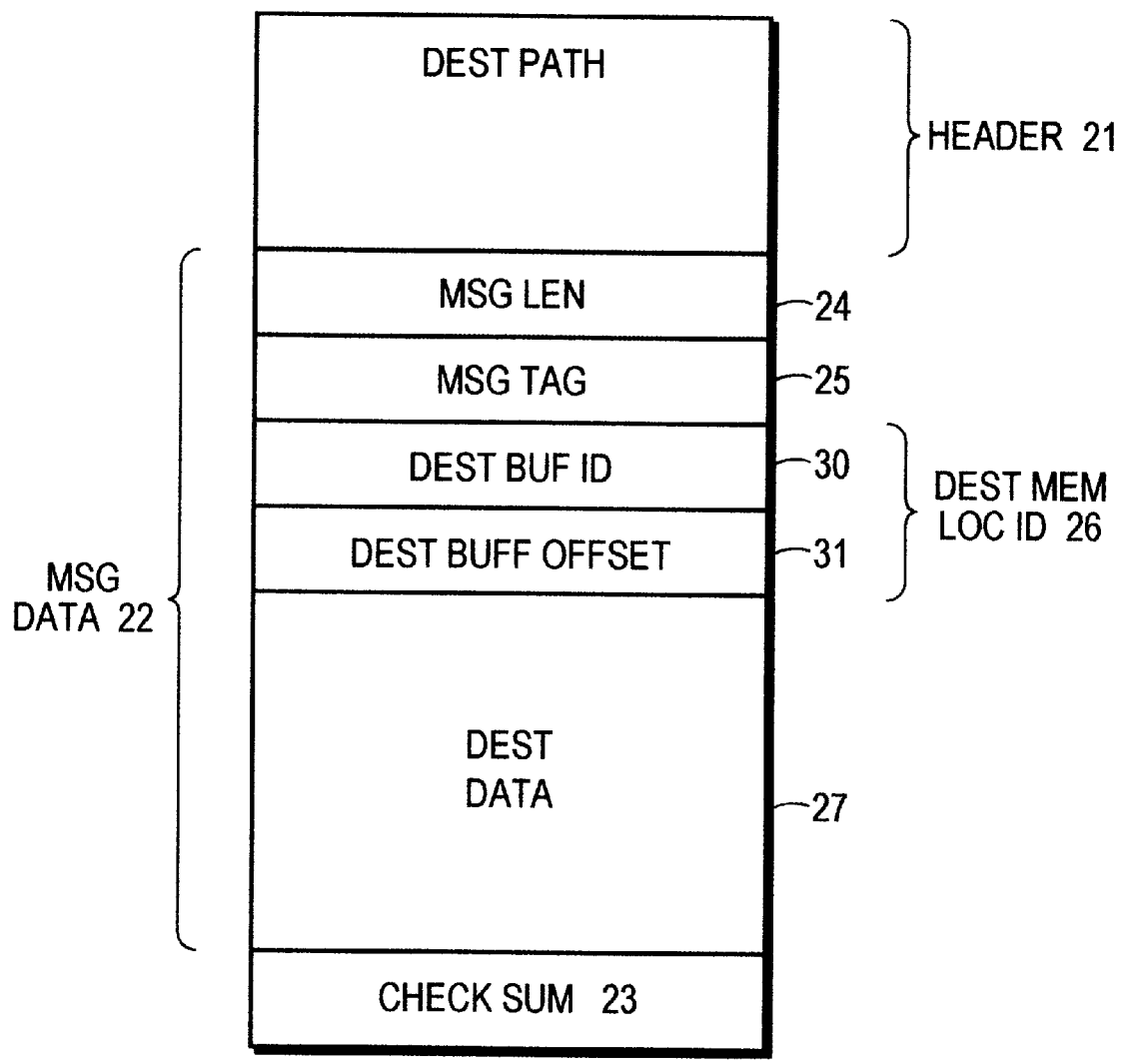
FIG. 2 is a diagram depicting the structure of message packets transmitted over the communications network depicted in FIG. 1.

The aforementioned Wells, et al., and Douglas, et al., applications further describe in detail the structure of message packets which are transmitted over the communications network 15 to effect information transfers thereover. The invention described herein makes use of input/output message packets 20 transmitted over the communications network 15, in particular the data router, which have a structure which is depicted in FIG. 2. With reference to FIG. 2, an input/output message packet 20 includes a header portion 21, a message data portion 22 and a checksum portion 23. The header portion 21 includes destination path information which is used to identify a path through the communications network 15 from the particular entity [that is, the processing element 11, control processor 12, input/output control processor 13 or input/output device 14] that generates and transmits the message, to the entity that is to receive the message. The message data portion 22 includes a number of fields, including a message length field 24, a message tag field 25, a destination memory location identifier field 26 and a destination data field 27. The message length field identifies the length of the message data portion 22. The message tag field 25 may contain operating system information identifying the packet as an input/output message packet 20, from among other types of message packets which may be transmitted over the communications network 15.

The contents of the destination memory location identifier field 26 provides information used by the receiving entity in determining where to store data contained in the destination data field 27. As described in more detail for one embodiment in the aforementioned Wells, et al., application, during an input/output operation the receiving entity buffers data in one or more input/output buffers. In that embodiment, the contents of the destination memory location identifier 26 may be used to identify a base storage location for the particular input/output buffer and an offset from the base, into which the contents of the destination data field 27 are to be stored. In the embodiment described in the aforementioned Wells, et al., and the Douglas, et al., applications, messages transmitted over the communications network 15 by a source entity in a selected order may be received by a destination entity in random order, and so the buffer offset value may be used by the destination entity to order the data as it is received by storing the data in the storage location identified by the offset. The destination memory location identifier field 26 may include a destination buffer identifier slot 30 and a destination buffer offset slot 31, which contain the buffer identifier and offset information, respectively.

Finally, the checksum portion 23 contains a checksum value which may be used by the receiving entity to verify that the input/output message packet 20 was correctly transferred by the communications network 15.

The invention, in one aspect, provides an arrangement for (a) facilitating the transfer of data from a plurality of source entities, such as a plurality of processing elements 11, to a plurality of destination entities, such as a plurality of input/output devices 14, for, for example, storage, in which an error detection and correction (EDC) code is generated and stored on one or more input/output devices separate from the input/output devices on which the corresponding data is stored, and (b) reconstructing the data or EDC code in the event of a failure of an input/output device 14.

Figure 3A:
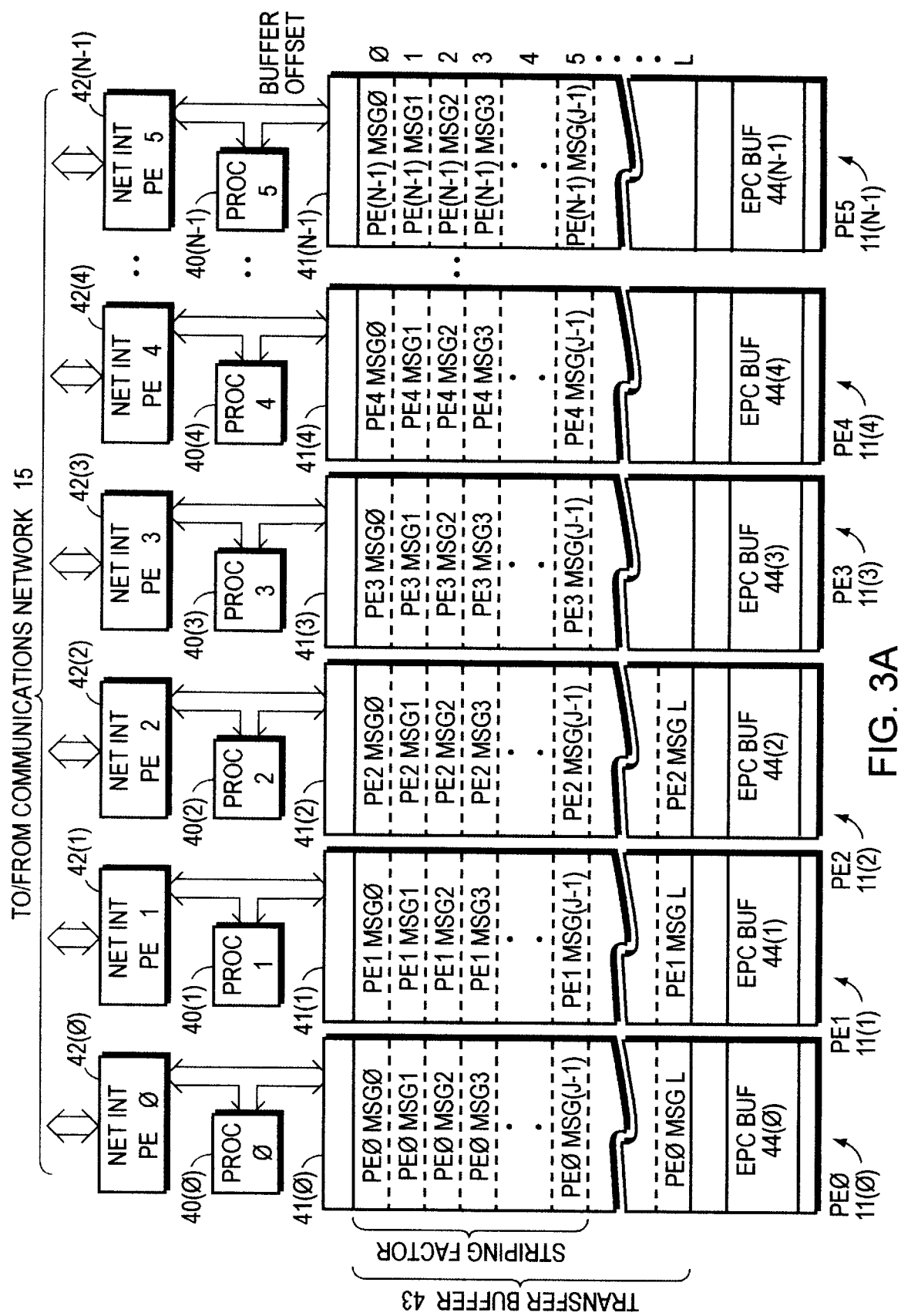
FIGS. 3A and 3B are logic diagrams depicting the general structure of selected portions of the computer system of FIG. 1 useful in understanding the invention.
Figure 3B:
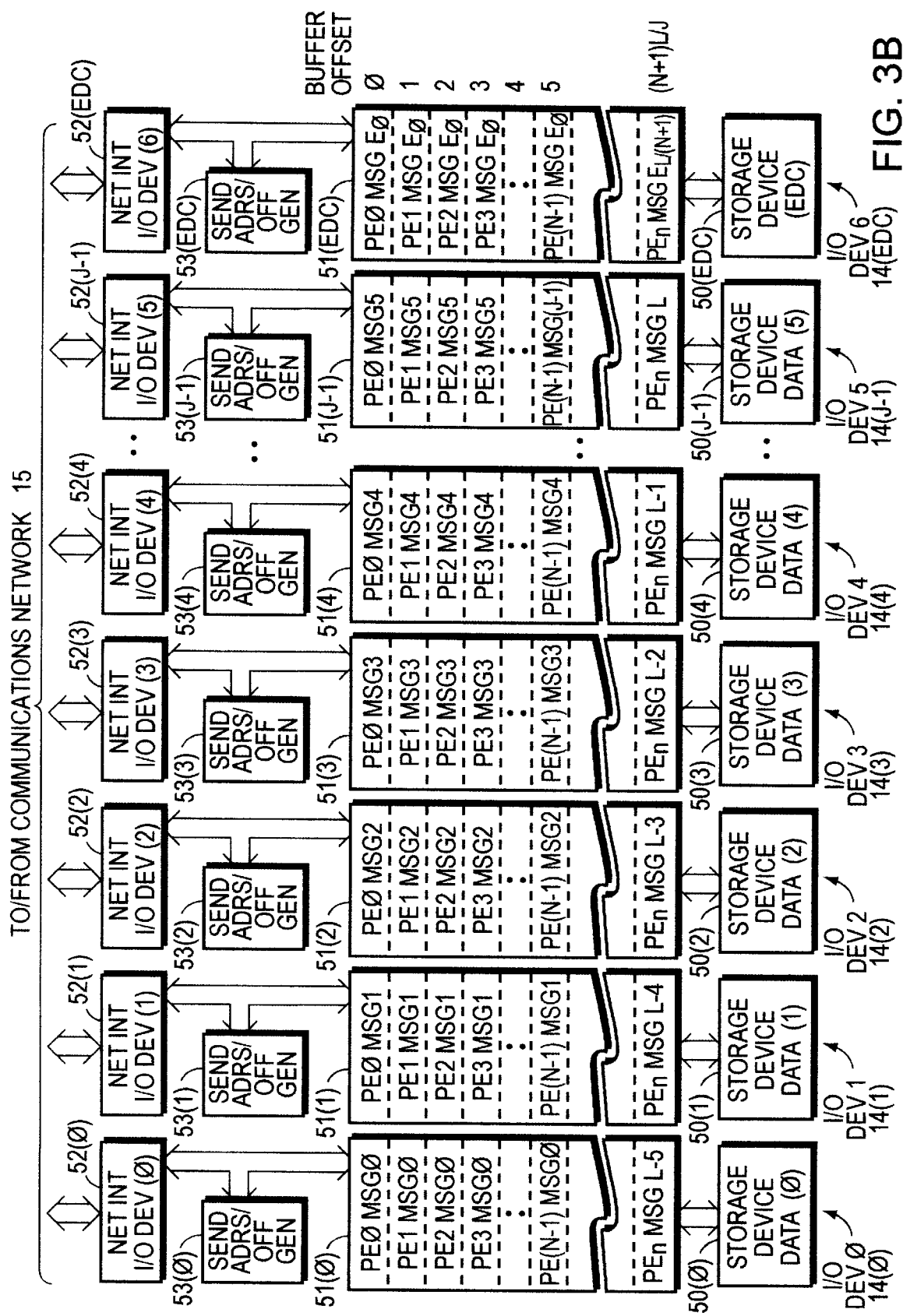

A general description of an input/output operation will be presented in connection with FIGS. 3A and 3B. These FIGS. schematically depict, respectively, a number of processing elements 11(0) through 11(N−1) (FIG. 3A) [generally identified by reference numeral 11(n)] and a number of input/output devices 14(0) through 14(J−1) [generally identified by reference numeral 14(j)] and 14(EDC) (FIG. 3B) which are to participate in an input/output operation. With reference to FIG. 3A, each processing element 11(n) includes a processor 40(n), a memory 41(n) and a network interface 42(n). The network interface 42(n) receives messages from the communications network 15, which may include, inter alia, data, program instructions and commands (generally, data), for storage in the memory 41(n), and, under control of the processor 40(n), generates messages using data from memory 41(n) for transmission over the communications network 15. The memory 41(n) stores information used by the processor 40(n) to perform processing operations. The processor 40(n) performs processing operations in connection with data and instructions stored in the memory 41(n). In addition, the processor 40(n) controls operations of the network interface 42, enabling it to generate messages using data from the memory 41(n) and, in one embodiment, controlling storage in the memory 41(n) of data that the network interface 42(n) receives from the communications network 15.

Each input/output device 14(j), 14(EDC) also includes a network interface 52(j), 52(EDC) and a memory 51(j), 51(EDC). In addition, each input/output device 14(j), 14(EDC) will also include a data source for providing data and/or a data sink for receiving data, which, in the illustrative embodiment described herein, is a storage device 50(j), 50(EDC) such as a disk or tape drive. In a retrieval operation, in which data is transferred from the input/output devices 14(j), 14(EDC) to the processing elements 11(n), data from the storage device 50(j), 50(EDC) is loaded into the corresponding memory 51(j), 51(EDC), and the network interface 52(j), 52(EDC) uses the data in the memory 51(j), 51(EDC), along with destination processing element identifiers and buffer offset values generated by a send address/offset generator 53(j), 53(EDC) to generate messages for transmission over the communications network 15. [The operation of the send address/offset generator 53(j), 53(EDC) is described in detail in the Wells, et al., application, and will not be described herein.] In a storage operation, in which data is transferred from the processing elements 11(n) to the input/output devices 14(j), 14(EDC) for storage, the network interface 52(j), 52(EDC) receives messages and stores the data in the memory 51(j), 51(EDC) using the contents of the destination memory location identifier field 26. Thereafter, data may be transferred from the memory 51(j), 51(EDC) to the storage device 50(j), 50(EDC) for storage.

The number of processing elements 11(n) and of input/output devices 14(j) is generally arbitrary, and the number of processing elements 11(n) which participate in an input/output operation need not have any relation to the number of input/output devices 14(j). In the event one input/output device fails, the EDC codes stored in input/output device 14(EDC) may be used, along with the data stored in the input/output devices which have not failed, to reconstruct the data stored in the failed input/output device, as described below. The group of input/output devices 14(0) through 14(J−1), along with input/output device 14(EDC), will be termed herein a "reconstruction group," since they collectively contain sufficient information to reconstruct data in the event of a failure of one of the input/output devices 14(0) through 14(J−1). It will be appreciated from the following that the reconstruction group can further be used to reconstruct the EDC codes stored in input/output device 14(EDC), since the data stored on the remaining input/output devices 14(0) through 14(J−1) was originally used to generate the EDC codes.

FIG. 3A further depicts the organization of data items [data transferred in an individual input/output message packet 20 during an input/output operation will be identified hereinafter as a "data item."] in the memories 41(n) of the processing elements 11(n) and FIG. 3B depicts the organization of data items and associated EDC codes in the memories 51(j), 51(EDC) of input/output devices 14(j), 14(EDC) for an input/output operation. In particular, with initial reference to FIG. 3A, during a storage operation, data to be transferred by each processing element 11(n) is stored in a transfer buffer 43(n), which is a region in its respective memory 41(n). Data items are distributed among the processing elements 11(n) in a compact and uniform manner, that is, all processing elements 11(n) will have approximately the same number of data items to be transferred; preferably, if there are N processing elements 11(0) through 11(N−1), and there are NL+R (where "R" is less than "L") data items to be transferred to the input/output devices 14(j) by the processing elements 11(n), then all processing elements 11(n) will have at least "L" data items to be transferred, and "R" processing elements 11(n) will have one additional data item. Preferably the processing elements 11(n) which have an additional data item will comprise processing elements 11(0) through 11(R−1).

The data items to be transferred by the processing elements 11(n) are represented in FIG. 3A by the legends "PE0 MSG0," PE0 MSG1," and so forth, which will generally be identified by "PEn MSGx." As shown in FIG. 3A, the data items PEn MSGx are stored in the memory 41(n) of each processing element 11(n), at successive locations in the transfer buffer 43(n), at offsets which correspond to the value of "x." Thus, the data items PE0 MSG0, PE0 MSG1 and PE0 MSG2, through PE0 MSGL, are shown stored at offsets "0", "1" and "2," through "L," in the transfer buffer 43(0) of memory 41(0). Similarly, the data items PE1 MSG0, PE1 MSG1 and PE1 MSG2, through PE1 MSGL are shown stored at offsets "0", "1" and "2," through "L," in the transfer buffer 43(1) of memory 41(1). If any processing element 11(n) has only "L" data items PEn MSG0 through PEn MSGL-1, they will be stored at offsets "0" through "L−1" of the transfer buffer 43(n) in the memory 41(n).

Figure 4A:
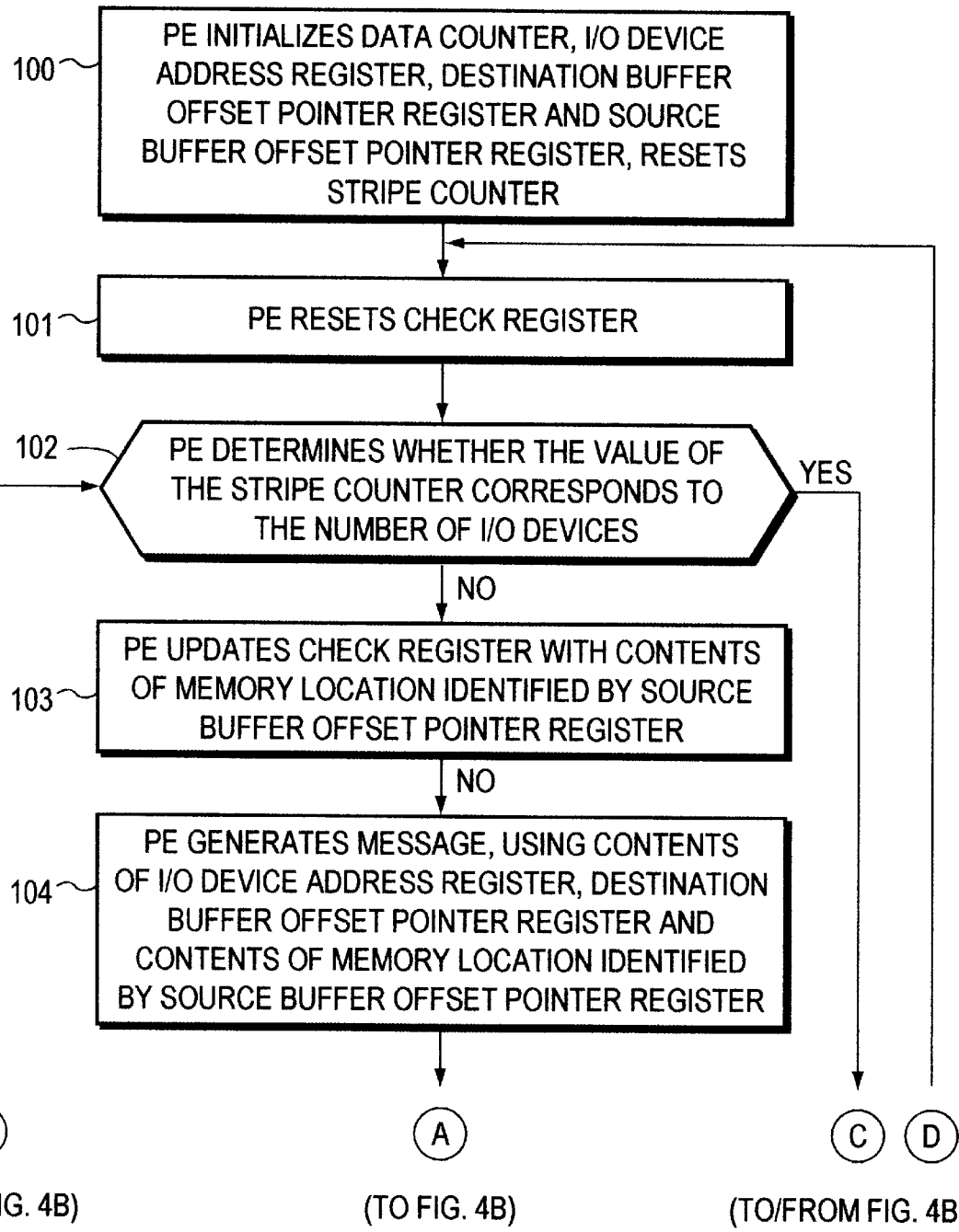
FIGS. 4A through 6C depict flow charts describing operations performed by various portions of the parallel computer system in accordance with the invention
Figure 4B:
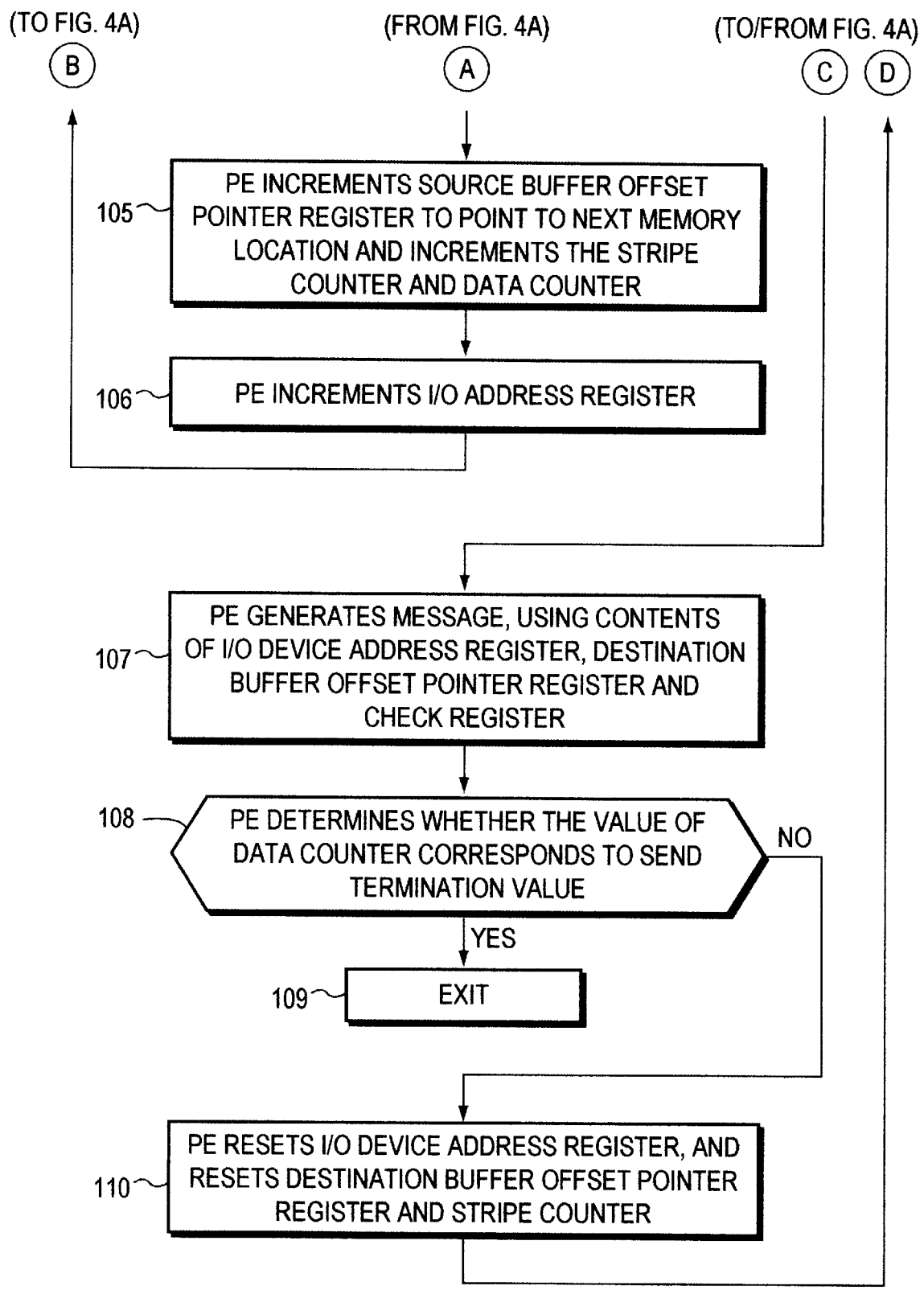

The operations performed by a processing element 11(n) during a storage operation will be described below in detail in connection with FIGS. 4A and 4B. In general, each processing element 11(n) generates input/output message packets for transfer over the communications network 15 using the data items PEn MSGx stored at sequential buffer offsets, and in addition generates input/output message packets containing an EDC code as the data item PEn MSGEy. In the illustrative system shown in FIGS. 3A and 3B, having input/output devices 14(0) through 14(J−1), and in which input/output device 14(EDC) stores EDC codes, each processing element 11(n) initially generates a series of input/output message packets using a sequence of data items PEn MSG0 through PEn MSGJ−1 from successive buffer offsets, with the input/output message packet for data item PEn MSG0 being directed to input/output device 14(0), the input/output message packet for data item PEn MSG1 being directed to input/output device 14(1), and so forth. In addition, an input/output message packet for EDC code PEn MSGE0 will be directed to input/output device 14(EDC). After generating the input/output message packet for EDC code PEn MSGE0, the processing element 11(n) will generate input/output message packets for data items PEn MSGJ through PEn MSG2J−1 (not shown) for transmission to input/output devices 14(0) through 14(J−1) and the EDC code PEn MSGE1 related to such data items for transmission to input/output device 14(EDC). Accordingly, for each group of data items PEn MSGmJ through PEn MSG(m+1)J−1 ("m" an index) in a series of storage locations at successive offsets "mJ" through "(m+1)J−1," corresponding to the number of input/output devices 14(j) which store data items PEn MSGx, the processing element generates an EDC code as an additional data item PEn MSGEm.

Hereinafter, the "J" data items PEn MSGmJ through PEn MSG(m+1)J−1 in a particular processing element 11(n) for each value of index "m" will be referred to as a "stripe" and the collection of "NJ" data items PEn MSGmJ through PEn MSG(m+1)J−1 in all processing elements 11(0) through 11(N−1) in stripes with the same index "m" will hereinafter be referred to as a "block."

In generating input/output message packets 20 during a storage operation for a series of data items PEn MSGmJ through PEn MSG(m+1)J−1 in a stripe and the associated EDC code PEn MSGEm, the processing elements 11(n) will generate the packets to have the same destination buffer offset identifier value for slot 31 (FIG. 2), thereby to facilitate an association between the data items PEn MSGmJ through PEn MSG(m+1)J−1 and the EDC code PEn MSGEm in the input/output devices 14(j), 14(EDC). Preferably, the destination buffer offset identifier values used by the processing elements 11(n) will be such as to cause the data items PEn MSGmJ through PEn MSG(m+1)J−1 in the various stripes and the associated EDC codes to be interleaved. That is, for each stripe index "m", the input/output message packets 20 received by the input/output devices 14(j) will have buffer offset values in the respective destination buffer offset slots 31 to enable the input/output devices 14(j) to store data item from processing elements 11(n) with successive values of index "n" at successive offsets in its memory 51(j). Accordingly, the stripe of data items PE0 MSG0 through PE0 MSGJ−1 from processing element 11(0) will be stored at offset 0 in input/output devices 14(0) through 14(J−1), and the associated EDC code PE0 MSGE0 will be stored at offset 0 of the input/output device 14(EDC).

Similarly, the stripe of data items PE1 MSG0 through PE1 MSGJ−1 will be stored at offset 1 in successive input/output devices 14(0) through 14(J−1), and the associated EDC code PE1 MSGE0 will be stored at offset 1 of the input/output device 14(EDC). The last stripe of data items PE5 MSG0 through PE5 MSGJ−1 in the first block, and the associated EDC code PE5 MSGE0 will be stored at offset N−1 of the successive input/output devices 14(0) through 14(J−1) and 14(EDC). The data items PE0 MSGJ through PE0 MSG 2J−1 in the first stripe in the next block, along with the associated EDC code PE0 MSGE2, will be stored by the input/output devices 14(0) through 14(EDC) at the next offset N. Data items and associated EDC codes in successive stripes and blocks will be handled similarly.

Thus, in general, data item PEn MSGx ("n" from 0 to N, "x" from 0 to L) in each stripe will be stored in input/output device 14(j) (index "j" from 0 to J−1) at offset "s," where $$j = x \bmod(J)$$

$$s = n + (N+1) + GI[x/J]$$

where "mod" represents the modulo function, and "GI" represents the greatest integer function. Similarly, in general, EDC code PEn MSGEm will be stored in input/output device 14(EDC) at offset "$s_{EDC}$" where $$s_{EDC} = nm,$$

where "m" is the stripe index value.

At selected points in time during the storage operation, data items may be transferred from respective memories 51(j) to the respective storage devices 50(j) of the input/output devices 14(j) for storage. This may occur, for example, by all of the input/output devices in parallel when they all have received all of the data items to be stored. Alternatively, this may occur in individual input/output devices when each has received all of the data items it is to store. As a further alternative, an input/output device may initiate storage when it has received data items corresponding to a unit of storage for the particular storage device 50(j).

A retrieval operation, in which data stored by the input/output devices 14(j) is provided to the processing elements 11(n), can occur in either of two modes, namely, a normal retrieval mode and a data reconstruction mode. Operations performed by a processing element 11(n) in connection with the normal retrieval mode are described in detail below in connection with FIG. 5. In general, the normal retrieval mode is used to transfer only data items from the input/output devices 14(0) through 14(J−1) to the processing elements 11(n) for processing. The data reconstruction mode is used in the event of a failure of one of the input/output devices 14(f) ("f" an index between 0 and J−1), to facilitate a reconstruction of the data stored thereon by the processing elements 11(n). Operations performed by a processing element 11(n) in connection with the data reconstruction mode are described in detail below in connection with FIGS. 6A through 6C. The operations performed by each input/output device 14(j) in either the normal retrieval mode or the data reconstruction mode essentially will be the same as described in the aforementioned Wells, et al., application.

In a normal retrieval mode, the data items in each stripe are transferred from the input/output devices 14(0) through 14(J-1) to the processing elements 11(n) to essentially restore the data items to the condition shown in FIG. 3A. In that operation, the input/output devices 14(j) participating in the retrieval operation transfer the data items to be retrieved from their respective storage devices 50(j) to their respective memories 51(j), to provide that the data items effectively have the organization depicted in FIG. 3B. The input/output devices 14(j) will further generate input/output message packets using the data items, and transmit them over the communications network 15 to the processing elements 11(n), in the process generating addresses for headers 21 and destination buffer offset slots 31 of the respective input/output message packets in the manner described in the aforementioned Wells, et al., application. The result of the operation will be to place the data items in the condition shown in FIG. 3A.

Similar operations occur in the data reconstruction mode, except that the input/output device 14(EDC) which stores the EDC code also participates in the input/output operation. In that case, the data items are transferred from the input/output devices 14(0) through 14(J-1) to the processing elements 11(n) in the same manner as in the normal retrieval mode, and in addition the associated EDC codes associated with the data items are transferred by the input/output device 14(EDC) to EDC buffer 44(n) portions in the repective processing elements 11(n). The input/output device 14(EDC) will transfer the EDC codes so that the EDC code PEn MSGEm in the "m-th" location in buffer 44(n) is associated with the "m-th" stripe of data items PEn MSGmJ through PEn MSG(m+1)J-1 in the memory 41(n). The processing element 11(n) uses, for each stripe, the data items PEn MSGmJ through PEn MSG(m+1)J-1 in each stripe from the input/output devices, other than the data item PEn MSGmJ+f, if any, from the failed input/output device 14(f), along with the associated EDC code PEn MSGEm, to reconstruct the data item for the failed input/output device 14(f).

Initially, the input/output devices 14(j) participating in the retrieval operation transfer the data items to be retrieved from their respective storage devices 50(j) to their respective memories 51(j) as in the retrieval mode, the result being to provide that the data items effectively are organized the respective memories 51(j) as depicted in FIG. 3B. The input/output devices 14(j) will further generate input/output message packets using the data items, and transmit them over the communications network 15 to the processing elements 11(n), in the process generating addresses for headers 21 and destination buffer offset slots 31 of the respective input/output message packets in the manner described in the aforementioned Wells, et al., application. The result of the operation will be to facilitate a transfer of the data items from the input/output devices 14(j) to the processing elements 11(n), with the data items at each offset of input/output devices 14(0) through 14(J-1) being stored in sequential locations in the transfer buffer 43(n) of the respective memory 41(n) of processing element 11(n).

The input/output device 14(EDC) which stores the EDC code will also transmit the EDC codes to the processing elements 11(n) in a similar manner, enabling each processing element 11(n) to store the EDC codes previously generated for the data items in their respective transfer buffers 43(n) in an EDC buffer 44(n) in their respective memories 41(n) established to receive the EDC codes. The input/output device 14,(EDC) provides addresses for the headers 21 and destination buffer offset slots 31 for the messages containing the EDC codes to enable the processing elements to store the EDC codes in EDC buffer 44(n) (FIG. 3A) in their respective memories 41(n). The order of EDC codes stored in the EDC buffer 44(n) of each processing element 11(n) corresponds to the order of the stripes of data items stored in the transfer buffer 43(n), that is, the "m-th" EDC code in the EDC buffer 44(n) of a processing element 11(n) is related to (that was, was generated in response to) the "m-th" stripe of of data items in the transfer buffer 43(n).

Figure 6A:
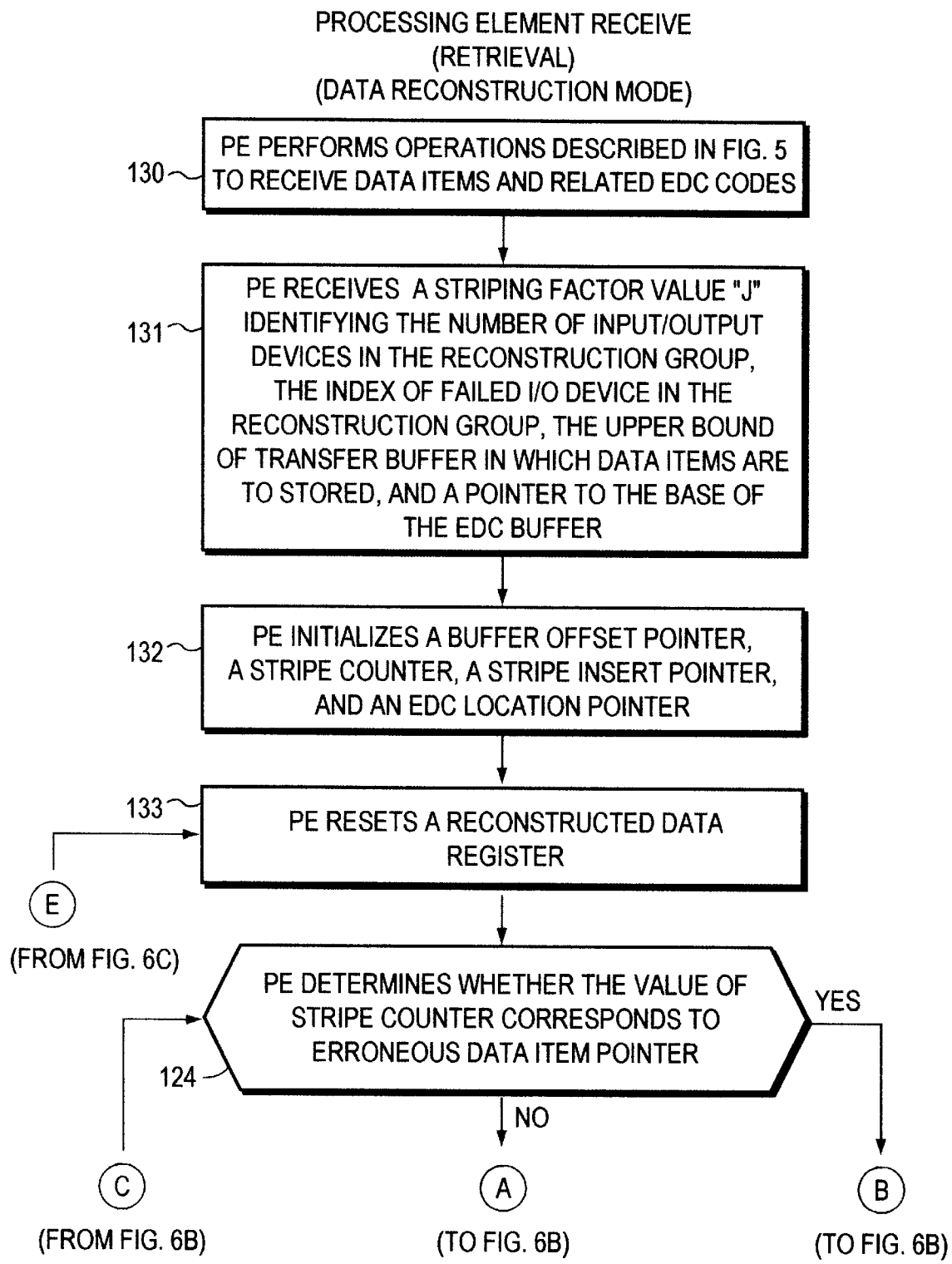
Figure 6B:
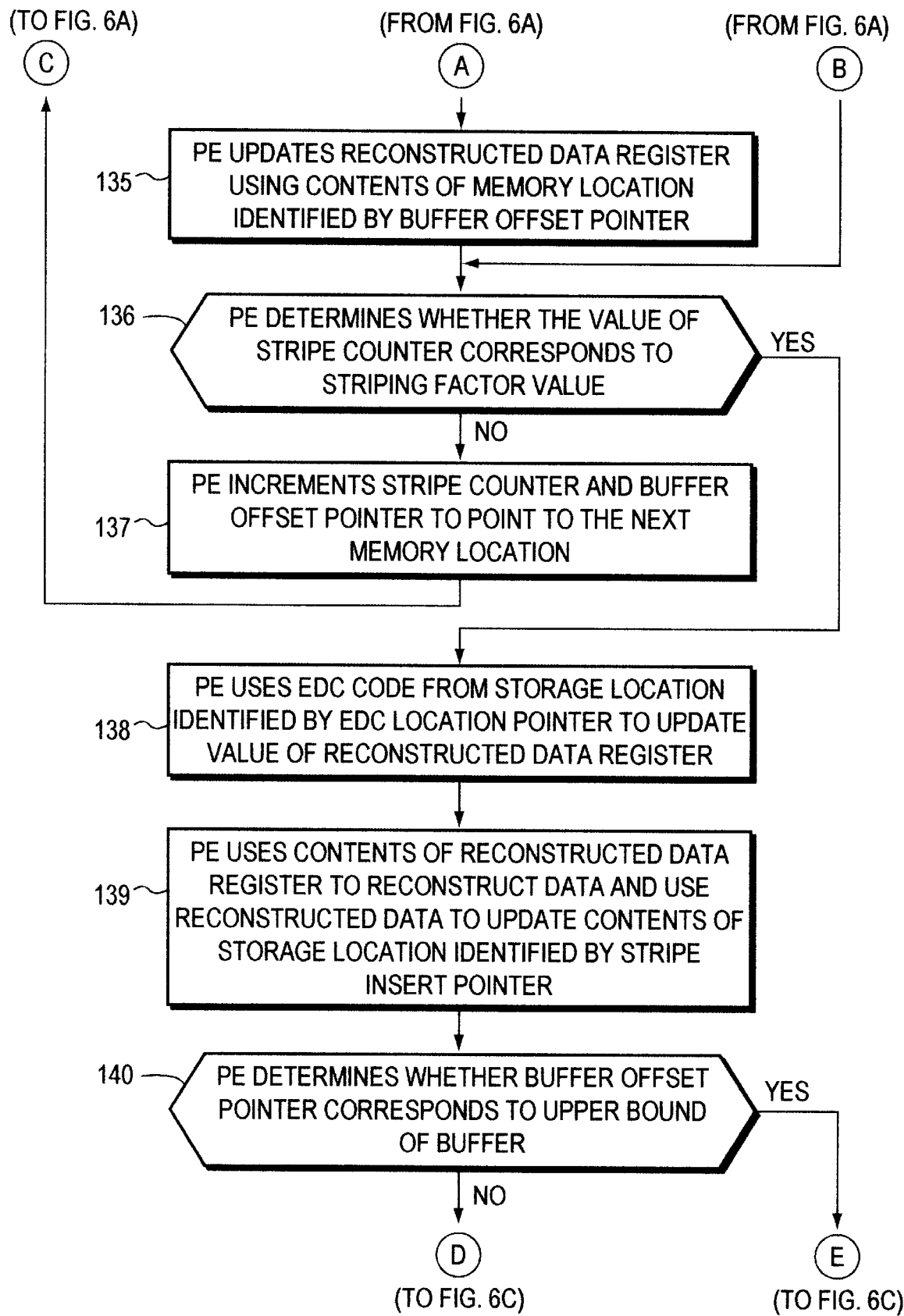
Figure 6C:
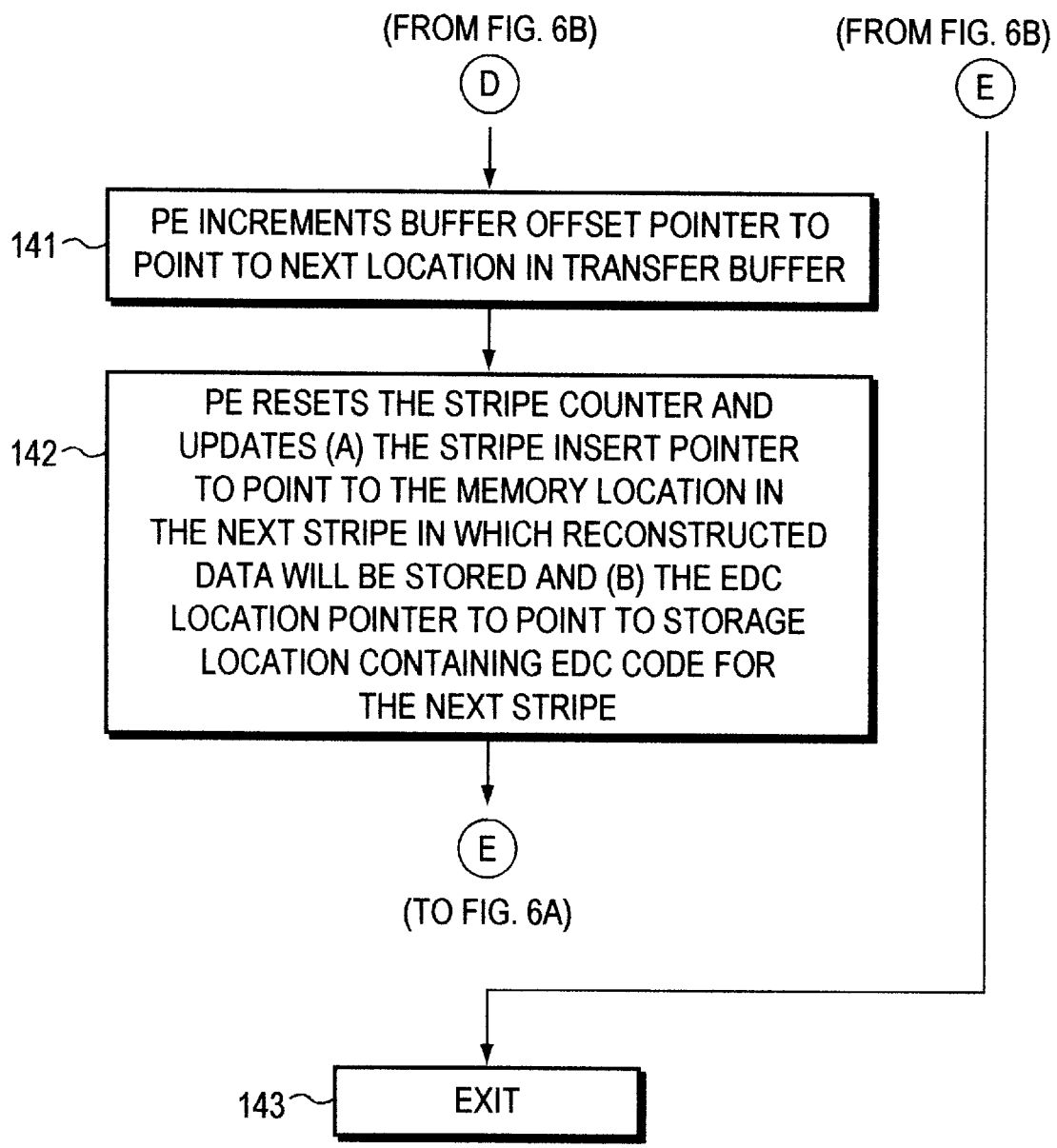

After the data items and associated EDC codes have been transferred to the processing elements 11(n), the data items for the failed input/output device can be easily reconstructed in a procedure described below in connection with FIGS. 6A through 6C. Thereafter, the reconstructed data items may be used or provided to a spare input/output device for storage.

With this background, the operations performed by each processing element 11(n) in connection with a storage operation will be described in connection with FIG. 4A. With reference to FIG. 4A, during a storage operation each processing element 11(n) first initializes a data counter, an input/output device address register, a destination buffer offset pointer register and a source buffer offset pointer register (step 100). The processing element will use the data counter to determine when it has transferred all of the data to be transferred to the input/output devices 14(j). The processing element will use the source buffer offset pointer register to identify, for each input/output message packet, the storage location in the processing element's memory 41(n) containing the data item to be used in generating the message packet. In generating input/output message packets, the processing element will also use the input/output device address register and the destination buffer offset pointer register to provide information for the header 21 (FIG. 2) and the destination buffer offset slot 31 of the packet. Initially, the input/output device address register will point to input/output device 14(0) and the destination buffer offset pointer register will point to the first location in the input/output device's buffer, identified in FIG. 3B as offset "0".

In addition, in step 100, the processing element 11(n) resets a stripe counter. The processing element will use the stripe counter to count successive data items for which it generates input/output message packets to allow it to determine when it has generated input/output message packets for all of the data items in the stripe. When the value of the stripe counter indicates that input/output message packets have been generated for a number of data items corresponds to the number in a stripe, the processing element 11(n) can generate an input/output message packet for the EDC code.

Following initialization in step 100, the processing element resets, a check register (step 101). The processing element will use the check register to, iteratively for each input/output message packet, use the data item used in generating the packet to update a check value stored in the check register. The processing element will us the check value in the check register in generating the EDC code PEn MSGEm for the destination data field of the input/output message packet for the EDC code. The processing element initially resets the check register in step 101 to ensure that the initial check value is null.

Thereafter, the processing element 11(n) sequences to step 102, in which it determines whether the value of the stripe counter exceeds the number of data items in a stripe, that is, the number of input/output devices 14(0) through 14(J-1) in the reconstruction group which store data items. At this point, the processing element 11(n) will make a negative determination in step 102, and so it will sequence to a series of steps 103 through 106 in which it generates an input/output message packet using the data item from the storage location in its memory 41(n) identified by the contents of the source buffer offset pointer register, in this case the data item PEn MSG0. In that series of steps, the processing element uses the contents of the memory location to update the contents of the check register (step 103) and generates the input/output message packet (step 104) using the contents of the input/output device address register and the destination buffer offset pointer register, as well as the data item PEn MSG0. At this point, the processing element may transmit the input/output message packet over the communications network 15 to the input/output device 14(j) identified by the header 21, or alternatively it may buffer the packet for later transmission. In one particular embodiment, the processing elements 11(n) generate all of the input/output message packets first, and then transmit the message packets using a random or skewed transfer methodology, which can reduce or eliminate congestion that might otherwise arise in the communications network 15.

After generating the input/output message packet in step 104, the processing element increments the source buffer offset pointer to point to the next storage location in its memory 41(n), and also increments the stripe counter and the data counter (step 105). In addition, the processing element adjusts the value of the input/output address register to point to the input/output device 14(b) (step 106) to receive the next input/output message packet. Since at this point the processing element 11(n) is generating input/output message packets for a series of data items in the same stripe, and all of the data items will be stored at the same offset in the input/output devices 14(j), the processing element does not at this point increment the destination buffer offset pointer register.

Following step 106, the processing element returns to step 102, and again determines whether the value of the stripe counter corresponds to the number of input/output devices 14(j). If the processing element again makes a negative determination in step 102, it repeats steps 103 through 106 to update the contents of the check register in connection with the data item in the storage location identified by the source buffer offset pointer register (step 103), to generate another input/output message packet in connection with that data item (step 104), and to increment the source buffer offset pointer, the stripe counter, the data counter (step 105) and the input/output address register (step 106), after which the processing element 11(n) again returns to step 102.

The processing element performs these operations in a series of iterations in connection with data items from successive locations in its memory 41(n) until it determines in step 102 that the value of the stripe counter corresponds to the number of data items in a stripe. In that condition, processing element has generated input/output message packets for data itesm PEn MSG0 through PEn MSGJ−1 comprising an entire stripe, which will be stored in the storage locations at the same offset in the memories 51(0) through 51(J−1) of sequence of input/output devices 14(0) through 14(J−1), and has updated (in step 103) the check register for all of the data items in the stripe. At this point, the input/output address register, as updated in step 106 of the previous iteration, points to the input/output device 14(g) which stores the EDC codes. Accordingly, the processing element 11(n) sequences to a series of steps 107, 108 and 110 to generate an input/output message packet to transfer the value in the check register as the EDC code PEn MSGE0 to input/output device 14(g). In that operation, when the processing element 11(n) makes a positive determination in step 102, it sequences to step 107 to generate an input/output message packet. In doing so, it performs operations similar to those described above in connection with step 104. That is, it generates an input/output message packet using the contents of the input/output address register and destination buffer offset pointer register for generating header field 21 and destination buffer offset slot 31, and the contents of the check register in generating destination data field 27.

The processing element 11(n) then determines whether the value of the data counter, which identifies the amount of data for which it has generated message packets, corresponds to a send termination value, which identifies the amount of data to be transferred. If not, it resets the input/output device address register to point to the first input/output device 14(0). In addition, the processing element resets the stripe counter to indicate that the next data item PEn MSGJ for which an input/output message packet is to be generated will be first data item in a new stripe. Further, the processing element 11(n) increments the destination buffer offset pointer register (step 110) so that the data items in the new stripe will be stored at a new offset in the destination input/output devices 14(j). In step 110, the processing element 11(n) increments the destination buffer offset pointer register by an amount corresponding to the number of processing elements 11(n) engaging in the input/output operation, so that the data items in the new stripe will be directed to the appropriate offset in the memories 51(j) of the input/output devices 14(j) for the next block of data items. Following step 110, the processing element 11(n) returns to step 101 to reset the check register and begin a series of iterations of steps 102 through 106 to generate input/output message packets for the next stripe of data items in its memory 41(n), followed by steps 107, 108 and 110 to generate an input/output message packet for the associated EDC code.

The processing element 11(n) repeats the operations described in connection with steps 102 through 108 and 110, generating input/output message packets for the data in each successive stripe and the associated EDC code, until it determines in step 108 that the value of the data counter corresponds to the send termination value. If the processing element 11(n) makes a positive determination in step 108, it has generated input/output message packets for all of the data items it is to transfer during the input/output operation and so it will sequence to step 109 to exit. After the processing element 11(n) exits in step is 109, it can transfer the input/output message packets over the communications network 15 if it has not previously done so. After all of the input/output message packets have been transferred, the data items will be organized in the memories 51(j) of the input/output devices 14(j) as shown in FIG. 3B.

Figure 5:
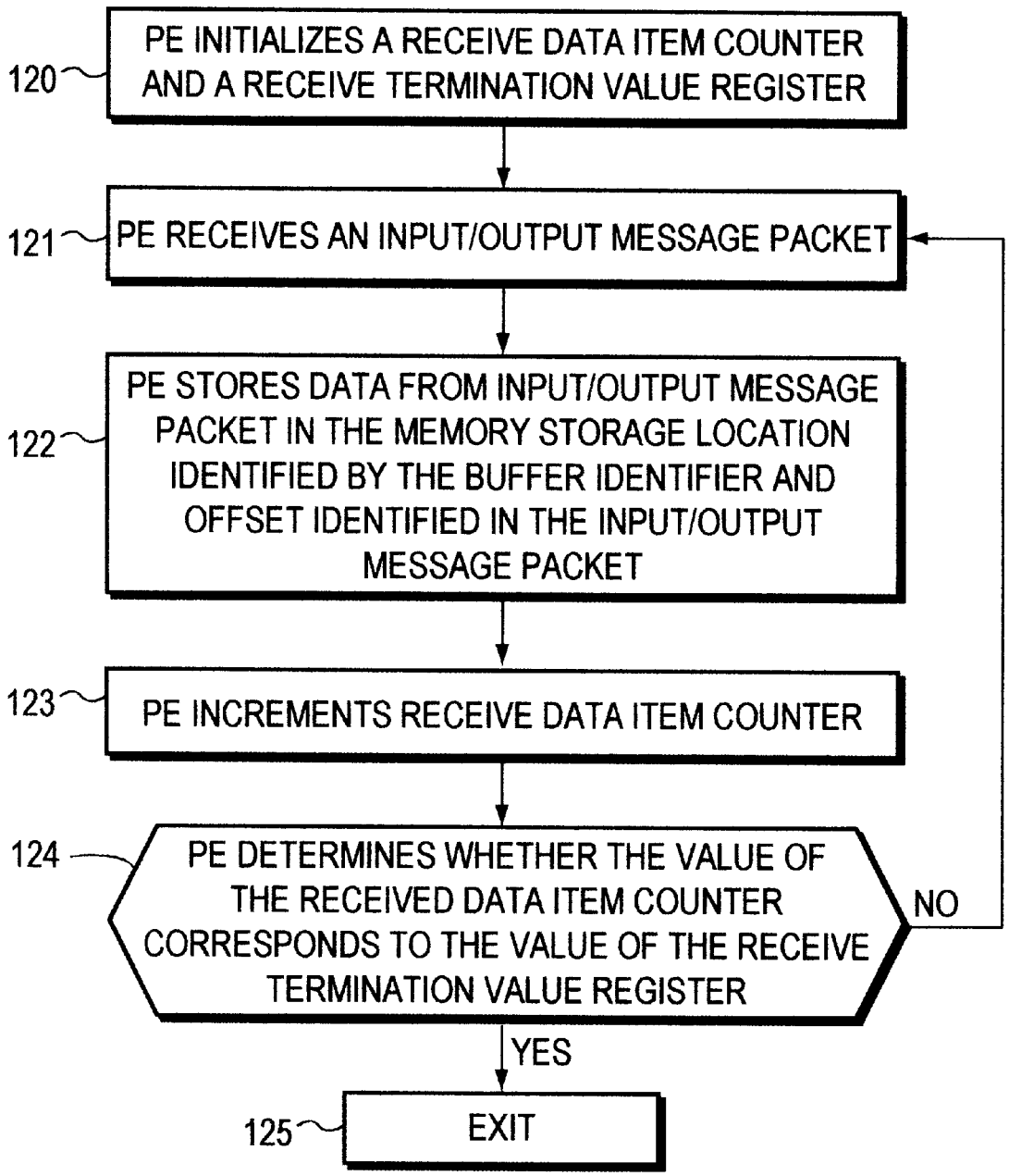

During a retrieval operation, the input/output devices perform operations described in the aforementioned Wells, et al., application to generate input/output message packets for transfer to the processing elements 11(n). FIG. 5 depicts the detailed operations performed by the processing elements 11(n) when receiving input/output message packets during the normal retrieval mode. Initially, the processing element 11(n) initializes a received data item counter and a receive termination value register (step 120). The processing element will use the received data item counter to maintain a running count of the number of data items received, and the receive termination value register will store a value that identifies the number of data items to be received during the input/output operation. It will be appreciated that the processing element 11(n) can determine when it has received all of the data items it is to receive during the input/output operation by determining when the value of the received data item counter corresponds to the value of the receive termination value register.

After step 120, the processing element 11(n) waits until it receives an input/output message packet for the input/output operation. When it receives such a message packet (step 121), it stores the data item from the packet in the storage location in its memory 41(n) identified by the contents of the destination memory location identifier field 26 of the input/output message packet 20 (step 122). In this operation, the processing element 11(n) stores the data item in the buffer in memory 41(n) identified by the contents of the destination buffer identifier slot 30 and destination buffer offset slot 31. Thereafter, the processing element increments the received data item counter (step 123). As noted above, the contents of the destination buffer identifier slot 30 in the input/output message packet 20 depicted in FIG. 2 effectively constitutes an identifier for the input/output operation; since the processing elements may be contemporaneously participating in several input/output operations and a variety of transfer operations over communications network 15, the processing element 11(n) can use the contents of the destination buffer identifier slot 30 to determine whether to increment the received data item counter in step 123. After incrementing the received data item counter, the processing element 11(n) determines whether the value of the received data item counter corresponds to the value of the receive termination value counter (step 124). If it makes a negative determination in step 124, it returns to step 121 to receive another input/output message packet.

The processing element 11(n) repeats the operations described above in connection with steps 121 through 124 until at some point it makes a positive determination in step 124. When the processing element 11(n) makes a positive determination, it will have received all of the data items it is to receive during the input/output operation, and at that point it can exit the input/output operation (step 125).

In a retrieval operation in the data reconstruction mode (FIGS. 6A through 6C), the initial operations performed by the processing elements 11(n) are generally similar to the operations performed in the normal retrieval mode. The processing elements 11(n) will initially perform the operations described above in connection with FIG. 5 to enable them to receive data items from the input/output devices 14(j) and load them into their respective transfer buffers 43 (step 130). Thereafter, if it is determined that reconstruction is to proceed, the input/output device 14(EDC) transfers the EDC codes to the processing elements 11(n), which store the received EDC codes in their respective EDC buffers 44(n) in a similar manner. In addition, to facilitate reconstruction of data items, the processing element 11(n) will receive (a) a striping factor value corresponding to the number of data items in a stripe (which corresponds to the number of input/output devices 14(j) in the reconstruction group from which it will be receiving data items), (b) the upper bound of the transfer buffer 43 in which the data items are store, (c) an erroneous data item index, corresponding to the index "f" of the failed input/output device 14(f) among input/output devices 14(j), which also effectively identifies the storage location within each stripe in which it is to store the the data item for the failed input/output device, and a pointer to the base of the EDC buffer storing the EDC codes to be used in the reconstruction (step 131).

Following step 131, the processing element proceeds to reconstruct the data item in each stripe identified by the erroneous data item index. In step 136, the processing element 11(n) first initializes a buffer offset pointer, a stripe counter, a buffer insert pointer, and an EDC code location pointer (step 132). The processing element 11(n) will use the buffer offset pointer to point to storage locations in the transfer buffer 43(n) in its memory 41(n) storing successive data items and the EDC code location pointer to point to locations in the EDC buffer storing EDC codes associated with successive stripes of data items. In reconstructing the data, the processing element 11(n) operates in a series of iterations, each iteration using storage locations storing a stripe of data items except for the storage location pointed to by the buffer insert pointer. In each iteration, the processing element 11(n) uses the stripe counter to identify when it has processed storage locations for all of the data items in a stripe. In each iteration, the processing element 11(n) will use the stripe insert pointer to identify the storage location in the stripe being processed during the iteration into which it is to insert the reconstructed data during the iteration.

More specifically, after the initialization in step 132, the processing element 11(n) resets a reconstructed data register (step 133), which it will use in the data reconstruction operation. The processing element 11(n) then determines whether the value of the stripe counter corresponds to the erroneous data item index (step 134). The value of the stripe counter represents an index, into the storage locations containing a stripe of data items PEn MSGmJ through PEn MSG(m+1)J−1 (in the first iteration m=0) to the storage location in the stripe currently being processed by the processing node 11(n), and the erroneous data item index identifies the location for the data item within the stripe that is associated with the failed input/output device. Accordingly, a positive determination in step 134 indicates that the storage location, if it contains a data item, contains data item PEn MSG(m+1)f associated with the failed input/output device 14(f) On the other hand, a negative determination in step 134 indicates that the storage location contains a data item no received from the failed input/output device 14(f), in which case the storage location contains a data item to be used in reconstructing the data item for the failed input/output device. If the processing element 11(n) makes a negative determination in step 134, it sequences to step 135 to use the data item from the storage location identified by the buffer offset pointer to update the data reconstruction register. On the other hand, if the processing element makes a positive determination in step 134, it will skip step 135, and will not update the data reconstruction register.

Following either step 135 (in response to a negative determination in step 134) or following step 134 (in response to a positive determination in that step), the processing element will determine whether the value of the stripe counter corresponds to the striping factor value (step 136). At this point, the processing element will make a negative determination in step 136 and sequence to step 137, in which it will increment the buffer offset pointer to point to the next storage location in its memory 41(n). Following step 137, the processing element 11(n) will return to step 134 to repeat the above-described operations (steps 134–137) with respect to the next storage location in the memory 41(n).

The processing element 11(n) will perform the operations described above in connection with steps 134 through 137 through a series of iterations until it determines in step 136 that the value of the stripe counter corresponds to the striping factor value. When that occurs, the processing element has updated the data reconstruction register with data items PEn MSGmJ through PEn MSG(m+1)J−1 (in this case, m=0) for the stripe, other than PEn MSG(m+1)f, that is, data items from all of the input/output devices 140) in the reconstruction group other than the failed input/output device. The processing element 11(n) then uses the EDC code from the storage location identified by the EDC location pointer to update the value in the reconstructed data register (step 138). At that point, the data item in the stripe that was originally stored in the failed input/output device is easily reconstructed from the contents of the data reconstruction register. Accordingly, following step 138, the processing element 11(n) sequences to step 139 to use the contents of the data reconstruction register to reconstruct this data item and store the reconstructed data item in the storage location identified by the erroneous data item index. As noted above, the storage location identified by the erroneous data item index is one within the stripe associated with the failed input/output device.

Following step 139, the processing element 11(n) determines whether the buffer offset pointer corresponds to the upper memory bound received in step 131 (step 140). If the processing element makes a negative determination in step 140 it has not processed all of the data items in the buffer, that is, all of the data items in the portion of the block received by the processing element 11(n). In that case, it will increment the buffer offset pointer to point to the next storage location in the transfer buffer 43(n) of its memory 41(n) (step 141). In addition, it will reset the stripe counter and it will also update the buffer insert pointer to point to the memory location in that next stripe associated with the failed input/output device and the EDC location pointer to point to the storage location in the EDC buffer 44(n) associated with the next stripe of data items (step 142). Thereafter, it will return to step 133 to reset the check register and perform operations described above in connection with the data items in the storage locations in the next stripe.

The processing element 11(n) will perform the operations described in connection with steps 133 through 142 through a series of iterations, during each iteration operating on data items PEn MSGmJ through PEn MSG(m+1)J−1 in the "m-th" stripe stored in its memory 41(n). In one iteration, it will determine in step 144 that the buffer offset pointer, which in that step identifies the storage location containing the last data item in the stripe processed during the iteration, corresponds to the upper bound of the buffer containing the data items. When that occurs, the processing element has processed all of the data items in the buffer, and so it will sequence to step 143 to exit. At that point, the processing nodes 11(n) may be enabled to use the reconstructed data in its transfer buffer 43(n) in connection with processing of programs. Alternatively, they may be enabled to transfer the reconstructed data to the input/output devices 14(j) (other than the failed input /output device) for storage.

The processing elements 11(n) may use any of a number of diverse types of EDC code generating methodologies for generating the EDC codes during the storage operation (FIGS. 4A and 4B), and the particular methodology selected will determine the reconstruction methodology used during data reconstruction. Since the failed input/output device 14(j) is known during data reconstruction, one methodology which may be advantageously used to generate the EDC code is effectively a bit-wise parity of the data items in a stripe. That is, if (a) each data item in a stripe is comprised of a series of bits $\{di_h\}$ ("h" is an index identifying the bit's location in the series), and (b) the check register used for generating the EDC code in step 103 comprises bit locations $\{cr_h\}$ when updating the check register in step 103 the processing element 11(n) will perform a bit-wise addition of each bit $di_h$ to the contents of the bit location $cr_h$ (without a carry to the next bit location $cr_h+1$) and store the result into the same bit location $cr_h$. It will be appreciated that this operation is essentially a bit-wise exclusive-OR of each bit $di_h$ of the data item with the corresponding "h-th" bit of the check register. After the processing element 11(n) has performed step 103 with all of the data items in a stripe, the "h-th" bit of the check register will effectively identify whether the number of "ones" in the "h-th" bit location of the data words in the stripe was odd or even; a "zero" in the "h-th" bit position of the check register indicates that the number of "ones" in the "h-th" bit position of the data items in the strip is even, whereas a "one" indicates that the number is odd.

When updating the check register during reconstruction in step 135, the processing element 11(n) performs the same bit-wise addition operation in connection with data items and EDC codes from the input/output devices 14(j) which have not failed, and the result after processing all of the data items in the stripe, that is, data items from all of the input/output devices 14(j) other than the failed input/output device 14(f), and the associated EDC code. This can be appreciated from the following:

(a) If, prior to the bit-wise addition of the EDC code in step 135, the "h-th" check register bit $cr_h$ is a "zero," indicating that the number of "ones" in the "h-th" bit of the data items (other than the data item from the failed input/output device) is even, and the "h-th" bit of the EDC code is a "zero," indicating that the number of "ones" in the "h-th" bit of data items is even, the "h-th" bit of the data item from the failed input/output device must be a "zero." Further, the addition of the "h-th" bit of the check register and the "h-th" bit of the EDC code in step 135 is "zero," the required value for the "h-th" bit of the data item from the failed input/output device.

(b) If, prior to the bit-wise addition of the EDC code in step 135, the "h-th" check register bit $cr_h$ is a "one," indicating that the number of "ones" in the "h-th" bit of the data items (other than the data item from the failed input/output device) is even, and the "h-th" bit of the EDC code is a "zero," indicating that the number of "ones" in the "h-th" bit of data items is even, the "h-th" bit of the data item from the failed input/output device must be a "one." Further, the addition of the "h-th" bit of the check register and the "h-th" bit of the EDC code in step 135 is "one," the required value for the "h-th" bit of the data item from the failed input/output device.

(c) If, prior to the bit-wise addition of the EDC code in step 135, the "h-th" check register bit $cr_h$ is a "zero," indicating that the number of "ones" in the "h-th" bit of the data items (other than the data item from the failed input/output device) is even, and the "h-th" bit of the EDC code is a "one," indicating that the number of "ones" in the "h-th" bit of data items is odd, the "h-th" bit of the data item from the failed input/output device must be a "one." Further, the addition of the "h-th" bit of the check register and the "h-th" bit of the EDC code in step 135 is "one," the required value for the "h-th" bit of the data item from the failed input/output device.

(d) If, prior to the bit-wise addition of the EDC code in step 135, the "h-th" check register bit $cr_h$ is a "one," indicating that the number of "ones" in the "h-th" bit of the data items (other than the data item from the failed input/output device) is odd, and the "h-th" bit of the EDC code is a "one," indicating that the number of "ones" in the "h-th" bit of data items is odd, the "h-th"

bit of the data item from the failed input/output device must be a "zero." Further, the addition of the "h-th" bit of the check register and the "h-th" bit of the EDC code in step 135 is "zero," the required value for the "h-th" bit of the data item from the failed input/output device. Accordingly, using the above-described EDC code generation and reconstruction methodologies, in step 138 the processing element 11(n) need merely use the contents of the check register as the reconstructed data item.

It will be appreciated that, while the data reconstruction mode has been described as being useful in reconstructing data or EDC codes from a failed input/output device 14(f), it also be used to correct errors in data detected by input/output devices which have not otherwise failed. However, since modern input/output devices typically can make use of internally-generated error detection and correction codes which they generate and store along with their resepctive data, an input/output device may itself be able to correct errors which it detects using the accompanying error detection and correction code before providing the data to the processing elements 11(n). On the other hand, if an input/output device which has not otherwise failed is unable to correct such errors in that manner, the data reconstruction mode may be used to correct such errors.

The foregoing description has been limited to a specific embodiment of this invention. It will be apparent, however, that various variations and modifications may be made to the invention, with the attainment of some or all of the advantages of the invention. For example, while, in the above description the number of processing elements 11(n) performing data reconstruction (FIGS. 6A through 6C) was the same as the number which originally generated the EDC codes, it will be appreciated that the number of processing elements involved in these two types of operations may differ. In addition, numerous modifications apparent to those skilled in the art may be made to details of the operations described in connection with FIGS. 4A through 6C. For example, during a retrieval operation, described above in connection with FIG. 5A, the processing elements 11(n) may not be provided with information relating to the number of data items to be tranferred thereto; instead, they may continue performing other processing operations and, whenever they receive message packetss containing data items from the communications network 15, load the data items into their respective memories in the locations identified in the respective message packets.

Furthermore, during a retrieval operation in the data reconstruction mode, the failed input/output device 14 may or may not participate in the input/output operation. If it does participate, the data items provided thereby to the processing elements will be received by the processing elements 11 and loaded into their appropriate locations in their respective memories. Alternatively, failed input/output device need not participate, in which case the storage locations which would contain data items from that input/output device will be empty. In either case, the processing element 11(n) will ignore data items from those locations during the data item reconstruction. It will be appreciated that if failure of the input/output device is due to failure of the input/output device's send address/offset generator 53(j), it would be preferable for the input/output device to not participate in the input/output operation, since it may generate addresses and buffer offsets that may cause data items to be erroneously overwritten.

Furthermore, while the system 10 has been described as having separate processing elements 11(n) and input/output devices 14(j), it will be appreciated that processing elements 11(n) may also include the components and perform the operations of the input/output devices as described above. Thus, if a parallel system includes processing/storage nodes each comprising components of a processing element and input/output device, and if the data items and EDC codes are generated and stored as on the processing/storage nodes as described above in connection with FIGS. 4A and 4B, if one of the processing/storage nodes fails the data stored on such a node can be recovered as described in connection with FIGS. 6A through 6C.

Therefore, it is the object of the appended claims to cover these and such other variations and modifications as come within the true spirit and scope of the invention.

What is claimed as new and desired to be secured by letters patent of the united states is:

1. A parallel computer system comprising a plurality of processing elements and an input/output system interconnected by a communications network:

A. the input/output system including a plurality of input/output devices connected to said communications network for receiving messages from, and transmitting messages to, said processing elements over said communications network; and B. each processing element including a memory including a series of storage locations for storing data items, the data items in the series of storage locations defining a series of stripes each including data items in a predetermined number of successive storage locations, the processors of all of said processing elements:

i. during a storage operation generating a series of messages for transmission over said communications network to successive input/output devices, each message including a data item from one of said storage locations, each processor generating for each stripe of data items a check value for transmission in a message to another of said input/output devices; and ii. during a reconstruction operation, receiving said data items and said check values from at least some of said input/output devices and performing a reconstruction operation in connection with each check value and a stripe of data values for which the check value was generated during the storage operation thereby to reconstruct data items stored in at least one other of said input/output devices.

2. A parallel computer system as defined in claim 1 in which each said processor transmits a series of messages generated for each stripe of data items and the check value to different ones of said input/output devices.

3. A parallel computer system comprising a plurality of processing elements and an input/output system interconnected by a communications network:

A. the input/output system including a plurality of input/output devices defining a reconstruction group, at least some of said input/output devices during a reconstruction operation transmitting messages over said communications network to each processing element including a different data item from a stripe of data items or a check value associated therewith; and B. each processing element, during a reconstruction operation, receiving data items and check values transmitted thereto by said input/output devices and performing a reconstruction operation in connection with each check value and a stripe of data values for which the check value was generated during a storage operation thereby to reconstruct data items in at least one other of said input/output devices.

4. A parallel computer system comprising a plurality of processing elements and an input/output system interconnected by a communications network:

A. the input/output system including a plurality of input/output devices connected to said communications network for receiving messages from, and transmitting messages to, said processing elements over said communications network; and B. each processing element including a memory including a series of storage locations for storing data items, the data items in the series of storage locations defining a series of stripes each including data items in a predetermined number of successive storage locations, each said processing element during a storage operation generating a series of messages for transmission over said communications network to successive input/output devices in said input/output system, each message including a data item from one of said storage locations, the processing element generating for each stripe of data items a check value for transmission in a message to another of said input/output devices, thereby to store different data items in each stripe and the associated associated check value on diverse ones or the input/output devices.

* * * * *